(12) United States Patent
Tanaka et al.

(10) Patent No.: US 8,959,193 B2
(45) Date of Patent: Feb. 17, 2015

(54) GROUP MANAGEMENT DEVICE

(75) Inventors: Ryuta Tanaka, Kawasaki (JP); Takashi Hamano, Kawasaki (JP); Atsuko Tada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 113 days.

(21) Appl. No.: 13/116,218

(22) Filed: May 26, 2011

(65) Prior Publication Data

US 2011/0231536 A1 Sep. 22, 2011

Related U.S. Application Data

(63) Continuation of application No. PCT/JP2008/072674, filed on Dec. 12, 2008.

(51) Int. Cl.
G06F 15/173 (2006.01)
H04L 29/08 (2006.01)
H04L 29/06 (2006.01)

(52) U.S. Cl.
CPC .......... H04L 67/1093 (2013.01); H04L 67/104 (2013.01); H04L 65/4084 (2013.01); H04L 67/303 (2013.01); H04L 67/1046 (2013.01)
USPC ........................... 709/223; 709/225; 709/240

(58) Field of Classification Search
CPC ............ H04L 65/4084; H04L 67/1046; H04L 67/1093; H04L 67/303
USPC ......................... 709/233, 224, 225
See application file for complete search history.

(56) References Cited

U.S. PATENT DOCUMENTS

| 7,139,242 | B2 * | 11/2006 | Bays ............................ 370/238 |
| 7,454,488 | B2 * | 11/2008 | Wechter et al. ............... 709/223 |
| 7,617,190 | B2 * | 11/2009 | Wright et al. .......................... 1/1 |
| 7,675,874 | B2 | 3/2010 | Jennings, III et al. |
| 7,751,355 | B2 * | 7/2010 | Leow et al. .................... 370/311 |
| 7,792,982 | B2 * | 9/2010 | Padmanabhan et al. ...... 709/231 |
| 2003/0009550 | A1 * | 1/2003 | Taylor et al. .................. 709/224 |

(Continued)

FOREIGN PATENT DOCUMENTS

| JP | 2004-318594 | 11/2004 |
| JP | 2005-94773 | 4/2005 |

(Continued)

OTHER PUBLICATIONS

International Search Report dated Mar. 3, 2009, from corresponding International Application No. PCT/JP2008/072674.

(Continued)

*Primary Examiner* — Dhairya A Patel
(74) *Attorney, Agent, or Firm* — Katten Muchin Rosenman LLP

(57) ABSTRACT

A group management device determines a priority level that represents priority order of allowing a participating terminal to preferentially participate in a group, to which the group management device belongs, based on information relating the participating terminal and information relating to terminals that are managed by the group management device only in a case where the group management device receives information relating to the participating terminal, which has transmitted a participation request to the group, to which the group management device belongs. Based on the determined priority level, the group management device determines whether to transmit the participation request to another group management device and whether to reply to the participating terminal.

10 Claims, 10 Drawing Sheets

(56) References Cited

U.S. PATENT DOCUMENTS

| | | | |
|---|---|---|---|
| 2003/0009570 A1 | 1/2003 | Moskowitz et al. | |
| 2004/0125760 A1 | 7/2004 | Newberg et al. | |
| 2005/0060406 A1* | 3/2005 | Zhang et al. | 709/225 |
| 2006/0209727 A1 | 9/2006 | Jennings, III et al. | |
| 2008/0275991 A1* | 11/2008 | Matsuzaki et al. | 709/225 |
| 2009/0239668 A1* | 9/2009 | Han | 463/42 |

FOREIGN PATENT DOCUMENTS

| | | |
|---|---|---|
| JP | 2005-109539 | 4/2005 |
| JP | 2005-252596 | 9/2005 |
| JP | 2006512855 | 4/2006 |
| JP | 2006-520023 | 8/2006 |
| JP | 2006-236344 | 9/2006 |
| JP | 2007-310673 | 11/2007 |

OTHER PUBLICATIONS

Minoru Nakazawa, et al. "An Implementation and Its Evaluation of Application Layer Multicast Distribution Tree Based on Associatively and Stability" Transactions of Information Processing Society of Japan, vol. 47, No. 2, Feb. 15, 2006, pp. 382-391.

\* cited by examiner

| ITEM | PARTICIPATION REQUEST |
|---|---|
| TERMINAL INFORMATION | 192.168.50.5:10050 |
| ISP INFORMATION | bbbbb.com |
| DEFAULT GATEWAY INFORMATION | 50:31:81:aa:c8:50 |
| PERFORMANCE INFORMATION | level 2 |
| CONNECTION NUMBER | 1 |
| CONNECTION HISTORY | 10000, 300, 23 |
| Valmax | 8000 |

FIG.4

| TERMINAL ID | TERMINAL INFORMATION | TERMINAL TYPE | |
|---|---|---|---|
| 10000 | IP ADDRESS: 192.168.10.5<br>PORT NUMBER: 10000<br>ISP INFORMATION: aaaaa.com<br>DEFAULT GATEWAY INFORMATION:<br>00:17:42:80:df:80<br>PERFORMANCE INFORMATION: level 5<br>CONNECTION NUMBER: 10<br>CONNECTION HISTORY: 5030, 2100, 50, | MANAGEMENT TERMINAL | 102a |
| 5030 | IP ADDRESS: 192.168.50.3<br>PORT NUMBER: 10050<br>ISP INFORMATION: bbbbb.com<br>DEFAULT GATEWAY INFORMATION:<br>50:31:81:aa:c8:50<br>PERFORMANCE INFORMATION: level 2<br>CONNECTION NUMBER: 1<br>CONNECTION HISTORY: 10000, 300, 23 | GENERAL TERMINAL | |
| 20050 | ... | DOWNSTREAM MANAGEMENT TERMINAL | |

FIG.5

| | ITEM | EVALUATION VALUE BASED ON DEGREE OF SIMILARITY AND TERMINAL CONDITIONS |
|---|---|---|
| 1 | DEFAULT GATEWAY INFORMATION | Val1={0,9000} |
| 2 | ISP INFORMATION | Val2={0, 100, 200, ···, 900} |
| 3 | PERFORMANCE INFORMATION | Val3={0, 10, 20, ···, 90} |

…

GROUP MANAGEMENT DEVICE

CROSS-REFERENCE TO RELATED APPLICATION

This application is a continuation of International Application No. PCT/JP2008/072674, filed on Dec. 12, 2008, the entire contents of which are incorporated herein by reference.

FIELD

The embodiment discussed herein is directed to a group management device.

BACKGROUND

Recently, with the rapid development and dissemination of network technologies, high-capacity content such as audio and video are being open to the public through a network. An example of the technology of delivering the content to the public is streaming delivery.

A client-server system is a general example of a network form that realizes large-scale streaming delivery. However, it inevitably requires expensive servers and building the network infrastructure therein, which results in a poor cost performance ratio.

For such a reason, as a network form that realizes large-scale streaming delivery without building up the expensive servers and the network infrastructure, there is known a technology using a peer-to-peer (hereinafter, referred to as P2P) system.

As an example of a network (hereinafter, referred to as a delivery network) that realizes streaming delivery through the application of the P2P system, a technique is known in which a terminal that has received data relays the received data to another terminal so as to perform sequential relay delivery to realize large scale delivery. This technique is advantageous in that the delivery load according to the increase in the number of terminals is less than that of the client-server system.

In a case where a new terminal is allowed to participate in this delivery network, it is necessary to search for a terminal (hereinafter, referred to as an optimal terminal for connection) that can continuously transmit data to the new terminal at a predetermined transmission rate to allow the new terminal to participate in the delivery network.

The known participation methods of a new terminal include a "hybrid-type P2P" system in which a server (hereinafter, referred to as a route management server) managing a delivery route determines a connection destination and instructs the new terminal to use the connection destination, a "pure-type P2P" system in which a connection destination is autonomously determined by searching between terminals not through a route management server, and the like.

In addition, as an intermediate method between the hybrid-type P2P and the pure-type P2P, there are known JXTA2 (P2P technology produced by Sun Microsystems) or a super node-type (or a super peer-type) P2P that is employed by skype (registered trademark) of an IP telephone service.

Furthermore, there are also known techniques of using a P2P system network which include a technique (for example, see Japanese Laid-open Patent Publication No. 2006-236344) of controlling access to a chat room and a technique (for example, see Japanese Laid-open Patent Publication No. 2005-109539) of searching for content information.

However, according to the above-described conventional technology, there are problems in that it is impossible to search for an optimal terminal with the amount of traffic of data, which is transmitted and received to determine a terminal to be connected, being appropriately suppressed, and it is difficult to build up a large-scale P2P network.

For example, in the hybrid-type P2P, as the terminal increases in number, the processing load of the route management server which to determine a connection destination and to manage the terminals increases. This will be described in detail with reference to FIG. 12. FIG. 12 is a diagram illustrating a problem with the hybrid-type P2P.

Here, a "new participating terminal" illustrated in FIG. 12 represents a terminal that newly participates in a delivery network. In addition, member terminals 1 to N represent terminals that transmit or receive content data such as audio or video through P2P communication. A "route management server" represents a server that manages terminal information of the member terminals 1 to N and selects a plurality of member terminals that are optimal for the connection of the new participating terminal and notifies of the selected member terminals.

In the hybrid-type P2P as illustrated in FIG. 12, when participation requests transmitted from new participating terminals are concentrated on the route management terminal and thus the traffic increases, the route selecting capability of the route management terminal becomes a bottle neck, and there is a problem in that it is difficult to realize large-scale streaming delivery.

On the other hand, according to the pure-type P2P, in a case where the number of terminals increases within a delivery network, in order to search for a terminal that is optimal for the connection, the amount of traffic of data transmitted for the search explosively increases. On the other hand, in a case where the amount of traffic for the search is limited, acquiring a terminal that is optimal for the connection is likely to be difficult.

This will be described in detail with reference to FIG. 13. FIG. 13 is a diagram illustrating a problem with the pure-type P2P. According to the pure-type P2P illustrated in FIG. 13, there is a problem in that the amount of traffic explosively increases in a case where a participation request transmitted from a new participating terminal is successively transmitted between the member terminals. On the other hand, in a case of limiting the number of times a new participating terminal transmits the participation request, a terminal that is optimal for the connection cannot be reliably found. Accordingly, there is a problem in that it is difficult to realize large-scale streaming delivery.

In addition, as an example of the intermediate method between the hybrid-type P2P and the pure-type P2P, there is a method in which a plurality of super nodes corresponding to route management terminals is provided, and terminals as search targets are determined based on a result of communications between the super nodes. After the terminals as the search targets are found, the super nodes end the search process.

Accordingly, even in a case where the intermediate method between the hybrid-type P2P and the pure-type P2P is used, each super node ends a search process at timing when the terminal as a search target is found, and therefore, the object of selecting several optimal terminals from among a plurality of candidates satisfying a condition is not achieved, and as a result, there is a problem in that it is difficult to realize large-scale streaming delivery.

SUMMARY

According to an aspect of an embodiment of the invention, a group management device includes a determination unit that determines, when receiving information relating to a participating terminal device that has transmitted a participation request to a group configured by aggregation of terminal devices performing communication, a first priority level representing priority order of allowing the participating terminal device to preferentially participate in a first group that is managed by the group management device, out of a plurality of groups, based on the information relating to the participating terminal device and information relating to terminal devices belonging to the group managed by the group management device; a priority level determining unit that determines whether or not the first priority level exceeds a second priority level determined in a second group that is managed by another group management device that has transmitted the information relating to the participating terminal device to the group management device; and a reply determining unit that determines whether to transmit a reply to the participation request with respect to the participating terminal device based on a determination result from the priority level determining unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram illustrating a terminal information managing table;

FIG. 5 is a diagram illustrating an example of calculation of evaluation values;

DESCRIPTION OF EMBODIMENT

Preferred embodiments of the present invention will be explained with reference to accompanying drawings. In this exemplary embodiment, although a connection mode of a terminal newly participating in a network (hereinafter, referred to as a delivery network) that realizes streaming delivery through peer-to-peer (hereinafter, referred to as P2P) will be described, however, the present invention is not limited to this exemplary embodiment.

Figure 1:
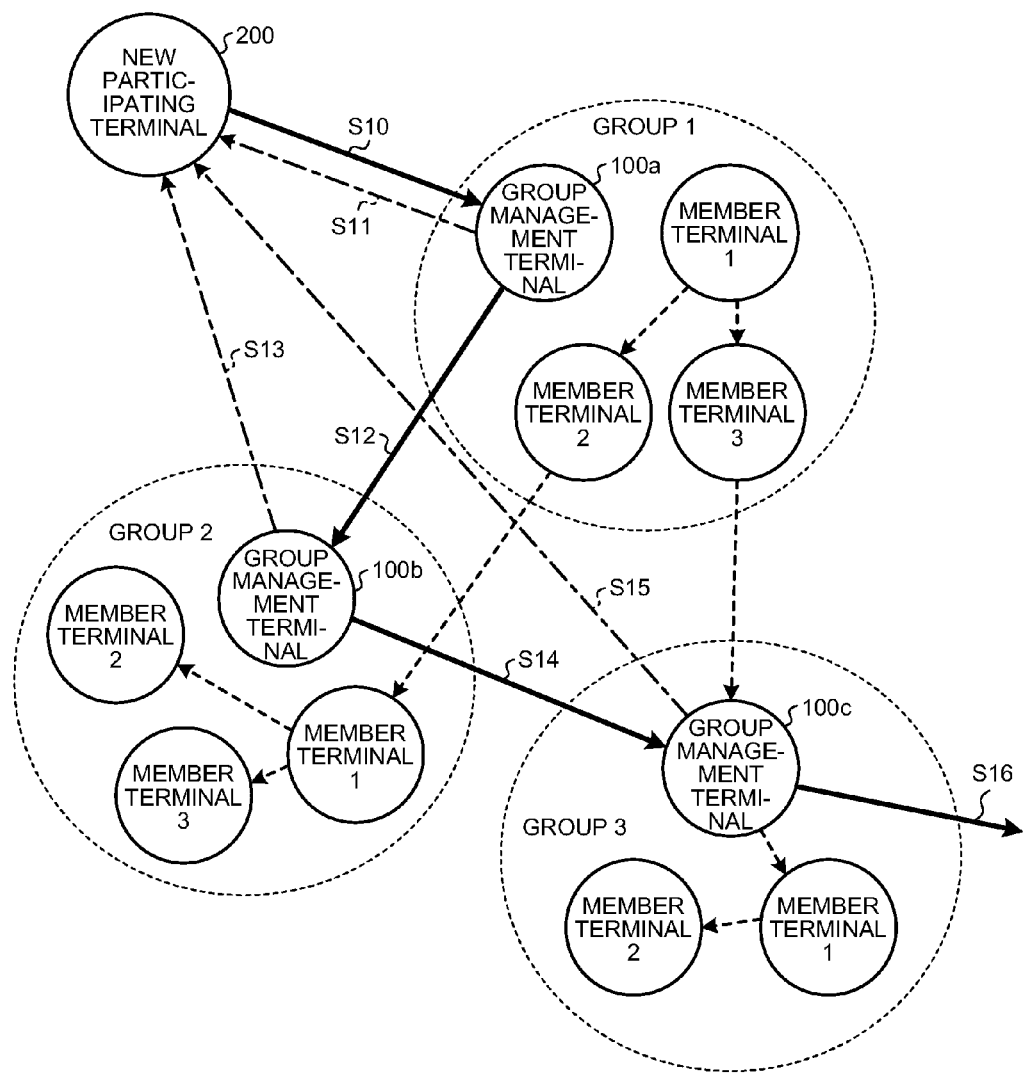
FIG. 1 is a diagram illustrating the features of a P2P network according to an embodiment.

First, the features of the P2P network according to an embodiment will be described. FIG. 1 is a diagram illustrating the features of a P2P network according to the embodiment. FIG. 1 illustrates a case where a new participating terminal 200 transmits a participation request (step S10) to a group management terminal 100*a* of Group 1 as an example. Here, in the participation request, information relating to the new participating terminal 200 is included.

In this case, the group management terminal 100*a* of Group 1 determines a priority level that represents the priority order for allowing the new participating terminal 200 to preferentially participate in Group 1, which is managed by the group management terminal 100*a*, out of a plurality of groups (Groups 1, 2, . . . ) based on the information relating to the new participating terminal 200 and information relating to member terminals belonging to Group 1.

Then, the group management terminal 100*a* of Group 1 replies to the participation request of the new participating terminal 200 (step S11) and transmits the participation request to a group management terminal 100*b* of Group 2 (step S12).

A member terminal represents a terminal that transmits and receives content data such as audio or video by means of P2P communication. Terminal information of each member terminal (for example, a member terminal 1, a member terminal 2, and the like of Group 1) is managed by each group management terminal (for example, the group management terminal 100*a* of Group 1).

After receiving the participation request to Group 2, the group management terminal 100*b* of Group 2 determines a priority level that represents the priority order of allowing the new participating terminal 200 to preferentially participate in Group 2 based on the information relating to the new participating terminal 200 included in the participation request and information relating to member terminals belonging to Group 2 and determines whether or not the priority level determined for Group 2 exceeds the priority level that has been determined for Group 1.

In a case where the priority level determined for Group 2 is determined to exceed the priority level determined for Group 1, the group management terminal 100*b* of Group 2 replies to the participation request of the new participating terminal 200 (step S13).

On the other hand, in a case where the priority level for Group 2 is determined not to exceed the priority level determined for Group 1, the group management terminal 100*b* of Group 2 does not reply (step S13) with respect to the new participating terminal 200.

In addition, in a case where the priority level determined for Group 2 is less than a threshold value set in advance, the group management terminal 100*b* of Group 2 transmits the received participation request to a group management terminal 100*c* of Group 3 (step S14).

On the other hand, in a case where the priority level determined for Group 2 is the above-described threshold value or more, the group management terminal 100*b* of Group 2 does not transmit (step S14) the received participation request to the group management terminal 100*c* of Group 3.

After the participation request to Group 3 is received, the group management terminal 100*c* of Group 3 determines a priority level that represents the priority order of allowing the new participating terminal 200 to preferentially participate in Group 3 based on the information relating to the new participating terminal 200 included in the participation request and information relating to member terminals belonging to Group 3 and determines whether or not the priority level determined for Group 3 exceeds the priority level that has been determined for Group 2.

In a case where the priority level determined for Group 3 is determined to exceed the priority level determined for Group 2, the group management terminal 100c of Group 3 replies to the participation request for the new participating terminal 200 (step S15).

On the other hand, in a case where the priority level for Group 3 is determined not to exceed the priority level determined for Group 2, the group management terminal 100c of Group 3 does not reply (step S15) to the new participating terminal 200.

In addition, in a case where the priority level determined for Group 3 is less than the above-described threshold value set, the group management terminal 100c of Group 3 transmits the received participation request to another group management terminal (step S16).

On the other hand, in a case where the priority level determined for Group 3 is the above-described threshold value or more, the group management terminal 100c of Group 3 does not transmit (step S16) the received participation request to another group management terminal.

The new participating terminal 200 determines a group or a member terminal, which is within the group, to be connected based on the reply from each group management terminal and notifies a corresponding group management terminal of the determination. Thereafter, the new participating terminal 200 is connected to a terminal that is optimal for connection and receives content data (a broken-line arrow illustrates a transmission route of the content data) that is relayed and delivered between the member terminals.

In this way, every time the priority level increases, a reply to the participation request is transmitted to the new participating terminal 200. Then, the new participating terminal 200 determines a member terminal belonging to a group having a high priority level as a connection destination terminal.

As described above, the group management terminal of each group according to this embodiment determines a priority level only in a case where a participation request is received. Then, a new participating terminal selects a terminal to be connected from a group having a highest priority level. Accordingly, the new participating terminal can determine a member terminal that is optimal for connection with high efficiency, and therefore, a traffic required for finding a member terminal that is optimal for connection can be suppressed.

Figures 2, 3:
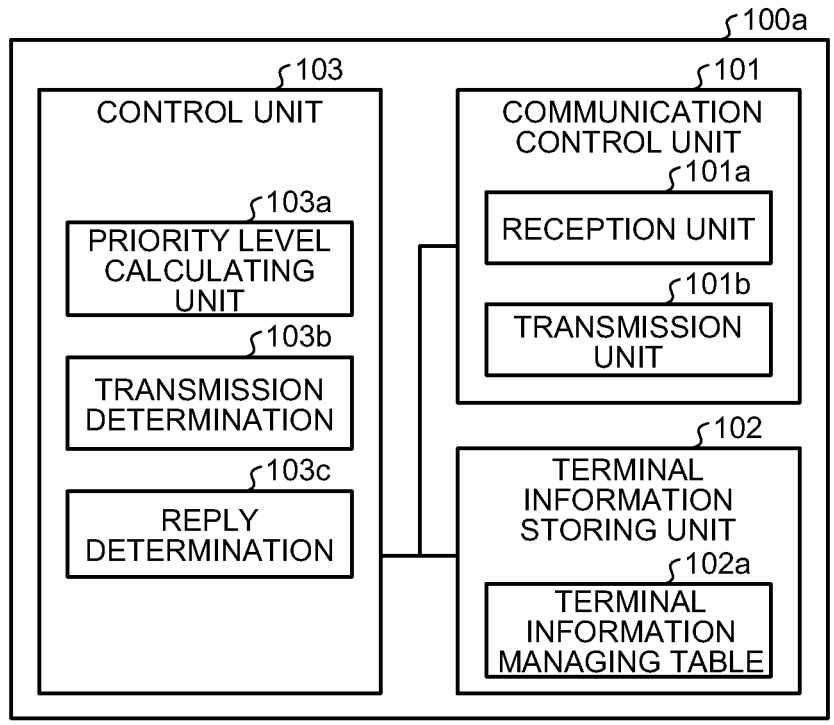
FIG. 2 is a functional block diagram illustrating the configuration of a group management terminal according to the embodiment.
FIG. 3 is a diagram illustrating an example of a participation request.

Next, the configuration of the group management terminal 100a according to the embodiment will be described. FIG. 2 is a functional block diagram illustrating the configuration of a group management terminal according to the embodiment. Hereinafter, a description is made as an example about a case in which the group management terminal 100a out of a plurality of group management terminals receives a participation request from the new participating terminal 200.

In a case where a participation request is received from the new participating terminal 200, the group management terminal 100a calculates a priority level and determines whether to transmit the participation request to another group management terminal (for example, the group management terminal 100b) based on the calculated priority level and determines whether a reply to the new participating terminal 200 is necessary.

As illustrated in FIG. 2, particularly, the group management terminal 100a closely relates to the present invention and includes a communication control unit 101, a terminal information storing unit 102 and a control unit 103.

The communication control unit 101 is a unit that receives a participation request from another group management terminal, transmits the received participation request, transmits a reply to a new participating terminal, and the like. The communication control unit 101 includes a reception unit 101a and a transmission unit 101b.

FIG. 3 illustrates an example of a participation request. In FIG. 3, the participation request includes items of "terminal information", "ISP information", "default GW information", "performance information", a "connection number", "connection history", and "Valmax".

The "terminal information" is the IP address and the port number of the new participating terminal 200. The "Internet Service Provider (ISP) information" is a domain name of a provider that provides an internet service to the new participating terminal 200.

The "default GW information" represents MAC address information of a default gateway (hereinafter, referred to as default GW). The example of FIG. 3 illustrates the media access control (MAC) address of a device (for example, a router, a computer, or the like) to which the new participating terminal 200 is connected.

The "performance information" represents the processing capability of a central processing unit (CPU), a random access memory (RAM), and the like of a new participating terminal 200. In this embodiment, as the number of the level is increased like level 1, level 2, level 3, . . . , the performance information represents that the new participating terminal has the performance of a high specification.

The "connection number" represents the capability of a new participating terminal 200 for being connected to a member terminal (for example, a member terminal 1 or a member terminal 2 within Group 1) and transmitting audio data or vide data.

In the example of FIG. 3, the connection number is "1", and, in this case, the new participating terminal 200 can transmit audio data or video data to one arbitrary member terminal. Accordingly, in a case where the connection number is "10", the new participating terminal 200 can transmit audio data or video data to ten arbitrary member terminals.

The "connection history" represents the IDs of terminals to which the new participating terminal 200 has been connected in the past. In the example of FIG. 3, "10000, 300, 23" is registered, and this represents that the new participating terminal 200 has been connected to member terminals of terminal IDs "10000", "300", and "23" in the past.

The "Valmax" represents the maximum priority level out of the priority levels calculated by the group management terminals of each group through which the participation request has passed. In FIG. 3, as an example thereof, "8000" is registered.

The reception unit 101a is a unit that receives a participation request from a new participating terminal 200 or a participation request transmitted from another group management terminal and outputs the received participation request to the control unit 103.

The transmission unit 101b is a unit that transmits a participation request to another group management terminal (for example, the group management terminal 100b or the group management terminal 100c) or transmits a reply to a new participating terminal 200.

The terminal information storing unit 102 is a unit such as a memory or a hard disk device that stores the terminal information of each member terminal (for example, the member terminal 1 and the member terminal 2 within Group 1) managed by the group management terminal 100a. This terminal information storing unit 102 stores a terminal information managing table 102a as the terminal information.

The terminal information managing table 102a is a unit that stores the IP addresses, the port numbers, the ISP information, the default GW information, and the like of each member terminal within the group to which the group management terminal 100a belongs, which is managed by the group management terminal 100a of Group 1, and the group management terminal 100a.

In FIG. 4, an example of the terminal information managing table 102a is illustrated. FIG. 4 is a diagram illustrating the terminal information managing table. The terminal information managing table 102a includes items of "terminal ID", "terminal information", and "terminal type".

The "terminal ID" represents the ID of the group management terminal 100a and the IDs of the member terminals managed by the group management terminal 100a, and, for example, "10000" represented in FIG. 4 represents the ID of the group management terminal 100a, and "5030" represents the ID of a member terminal (for example, the member terminal 1 within Group 1).

Meanwhile, "20050" represents a downstream management terminal and, to be more specific, represents the ID of a group management terminal other than the group management terminal 100a such as the group management terminal 100b or the group management terminal 100c illustrated in FIG. 1.

The "terminal information" represents the IP address, the port number, the ISP information, the default GW information, the performance information, the connection number, and the connection history of each terminal (the group management terminal 100a or each member terminal within Group 1).

The "terminal type" represents identification information of each terminal. The "terminal type" represents the group management terminal 100a in a case where the terminal type is "management terminal" and represents another group management terminal other than the group management terminal 100a in a case where the terminal type is "downstream management terminal".

On the other hand, in a case where the terminal type is "general terminal", it represents a member terminal (for example, the member terminal 1) within Group 1.

The control unit 103 is a unit that calculates the priority level based on the participation request transmitted to the group management terminal 100a from a new participating terminal 200 and performs communication control of each terminal that includes the determination of transmission and the determination of replying based on the calculated priority level. The control unit 103, particularly, closely relates to the present invention and includes a priority level calculating unit 103a, a transmission determination unit 103b, and a reply determination unit 103c.

The priority level calculating unit 103a, only in a case where the group management terminal 100a receives a participation request from a new participating terminal 200, calculates the priority level ValG based on the received participation request and the terminal information managing table 102a.

Subsequently, a method of calculating the priority level will be described using evaluation values illustrated in FIG. 5. FIG. 5 is a diagram illustrating an example of calculation of evaluation values. As illustrated in FIG. 5, evaluation values Val1, Val2, and Val3 can be assigned to the items "default GW information", "ISP information", and "performance information" as evaluation targets.

Here, any evaluation value of "0" and "9000" is set to Val1 using the degree of similarity to be described later. Similarly, any one value of "0", "100", "200", . . . , "900" is set to Val2, and any one value of "0", "10", "20", . . . , "90" is set to Val3. In addition, the value that is assigned to each item is set to have a different number of digits.

The above-described evaluation value is determined based on the degree of similarity or each terminal condition. For example, in a case where the evaluation value is determined using the degree of similarity, the priority level calculating unit 103a checks the stored terminal information managing table 102a (see FIG. 4) and the participation request (see FIG. 3) transmitted from the new participating terminal 200.

Then, when the default GW information is matched, it can be estimated by analogy that the networks of the two terminals are physically close to each other, and the terminals are present on a same sub-network, and the priority level calculating unit 103a sets 9000 as the evaluation value.

To be more specific, in a case where the default GW information of the participation request transmitted from the new participating terminal 200 matches the MAC address of the default GW information stored in the terminal information managing table 102a, the priority level calculating unit 103a sets 9000, which represents the highest priority level, to Val1.

In other words, in a case where the default GW information of the participation request transmitted from the new participating terminal 200 is "50:31:81:aa:c8:50", (see FIG. 3), and "50:31:81:aa:c8:50" (see the terminal ID "5030" in FIG. 4) is stored in the default GW information of the terminal information managing table 102a, the priority level calculating unit 103a assigns "9000" to Val1.

On the other hand, in a case where the MAC addresses of the default GW information do not match each other, it is difficult to make a further determination other than a determination that the terminals are on different sub-networks, and accordingly, the priority level calculating unit 103a assigns "0" to Val1.

In addition, the priority level calculating unit 103a sets one of 0, 100, 200, . . . , 900 to Val2 in accordance with the degree of match of the domain name included in the participation request transmitted from the new participating terminal 200 as the ISP information and the domain name stored in the terminal information managing table 102a as the ISP information.

To be more specific, in a case where the domain name included in the participation request is "bbbbb.com" (see FIG. 3) and the domain name registered in the terminal information managing table 102a is "bbbbb.com" (see the terminal ID "5030" in FIG. 4), the priority level calculating unit 103a assigns "200" to Val2.

On the other hand, in a case where the domain name included in the participation request is "bbbbb.com" (see FIG. 3) and the domain name registered in the terminal information managing table 102a is "aaaaa.com", the priority level calculating unit 103a assigns "100" to Val2.

Furthermore, in a case where the evaluation value is determined based on each terminal condition, the priority level calculating unit 103a assigns an evaluation value in accordance with the level number of the performance information or the number of connections. For example, in a case where the performance information is "level 1", the new participating terminal 200 represents the performance of a low specification, and accordingly, the priority level calculating unit 103a sets "0" to the evaluation value Val3. On the other hand, in a case where the performance information is "level 10", the new participating terminal 200 represents the performance of a high specification, and accordingly, the priority level calculating unit 103a sets "90" as the evaluation value Val3.

Then, the priority level calculating unit 103a finally adds the evaluation values assigned in accordance with each condition and determines the priority level ValG using the following equation.

$$ValG=Val1+Val2+Val3+\ldots$$

For example, in a case where the priority level calculating unit 103a assigns Val1=9000, Val2=200, and Val3=50 for the performance information, the connection number, and the connection history of the received participation, the priority level ValG is calculated as below.

$$Val1(9000)+Val2(200)+Val3(50)=ValG(9250)$$

Here, the higher the priority level ValG of a member terminal is, the more the member terminal is represented to be optimal for the connection of the new participating terminal 200. Then, the priority level calculating unit 103a calculates the priority level ValG between each member terminal within Group 1 and the new participating terminal 200 and sets the maximum priority level thereof as the priority level of Group 1. Hereinafter, the maximum priority level out of the priority levels ValG calculated by the priority level calculating unit of each group management terminal is denoted as $ValG_G$.

In the above-described example, although the priority level calculating unit 103a calculates the priority level giving priority to the default GW information by assigning an evaluation value "9000" having the largest number of digits for the default GW information, the priority level may be calculated by giving priority to the "performance information" or the "ISP information".

For example, a management terminal of a group desired to group terminals of a high specification may be configured to assign an evaluation value having the largest number of digits for the "performance information" of the new participating terminal 200, so that the priority level calculating unit 103a assigns an evaluation value (for example, "9000") having a large number of digits to a new participating terminal having a high level number, whereby the grouping of terminals of a high specification can be realized.

Accordingly, a new participating terminal side having the performance of a high specification selects a group that is configured by terminals of a high specification and then is connected to a terminal within the group, whereby the grouping of terminals of a high specification can be realized.

Furthermore, in a case where there are many member terminals of a low specification, a connection within the group may be promoted by giving higher priority to the specification than the network condition.

For example, in a case where a new participating terminal 200 is a terminal of a high specification, and a supervisor of the group management terminal unconditionally desires a connection of a new participating terminal 200 within the group, a value "10000" may be added to the priority level ValG so as to allow the priority level to be the highest.

In addition, there is a theoretic maximum value of the above-described priority level. For example, based on the example illustrated in FIG. 6, in a case where the priority level ValG is calculated using the evaluation values Val1, Val2, and Val3, the theoretical maximum value $ValG_M$ of the priority level is as follows.

$$Val1(9000)+Val2(900)+Val3(90)=ValG_M(9990)$$

As above, although the theoretical maximum value $ValG_M$ of the priority level is "9990", in a case where the theoretical maximum value is set as the threshold value Valth, a member terminal of which the priority level matches the threshold value Valth is necessarily a member terminal (a terminal that is optimal for the connection) having the highest priority level for connection by priority over the other member terminals.

Accordingly, there is high possibility that a connection is set up between the member terminal having the highest priority level and the new participating terminal 200, and the group management terminal 100a that has found such as member terminal within the group 1 determines further transmission of the participation request to be meaningless and does not transmit the participation request. As above, the searching for a terminal that is optimal for a connection and the suppressing of unnecessary transmission of a participation request can be achieved together.

The transmission determination unit 103b is a unit that determines the transmission or no-transmission of the participation request to another group management terminal based on the priority level $ValG_G$ calculated by the priority level calculating unit 103a. For example, in a case where the priority level $ValG_G$ calculated by the priority level calculating unit 103a is less than the threshold value Valth ($ValG_G$<Valth), the participation request is transmitted to another group management terminal.

On the other hand, in a case where the priority level $ValG_G$ calculated by the priority level calculating unit 103a the threshold value Valth or more ($ValG_G \geq$Valth), the participation request is not transmitted to another group management terminal.

Figure 6:
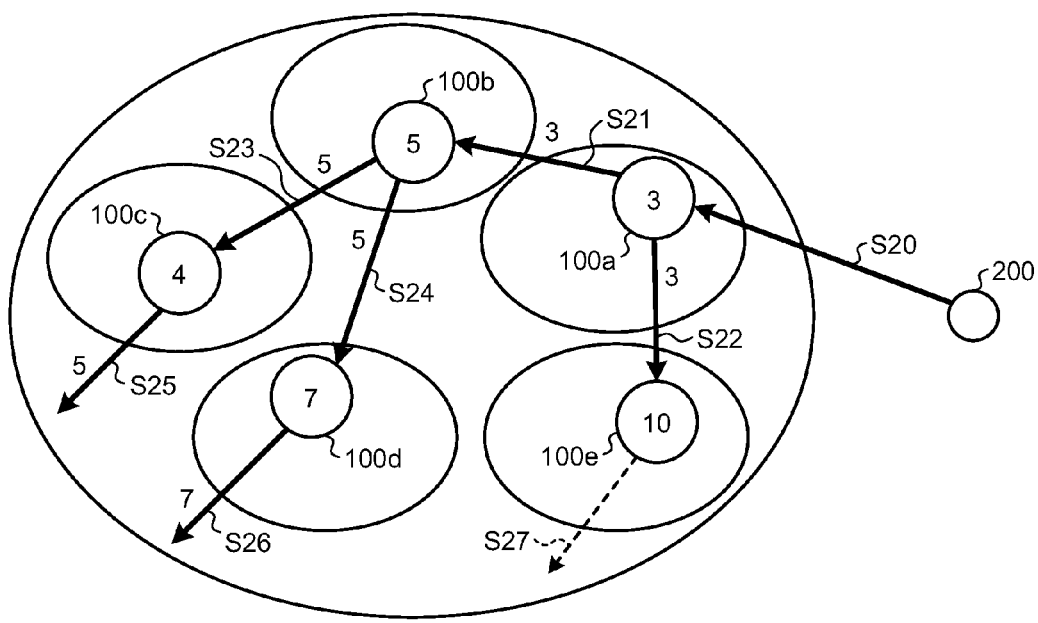
FIG. 6 is a diagram illustrating an example of determining transmission or no-transmission.

To be more specific, an example of the determination of transmission or no-transmission will be described with reference to FIG. 6. FIG. 6 is a diagram illustrating an example of the determination of transmission or no-transmission. FIG. 6 illustrates a case where the new participating terminal 200 transmits a participation request to the group management terminal 100a (step S20). A case is illustrated in which a plurality of the group management terminals is present, and it is assumed that each group management terminal has the same function as that of the group management terminal 100a. In addition, the above-described threshold value Valth is assumed to be "10".

First, the priority level calculating unit 103a calculates the priority level of the group to which it belongs, and it is assumed that a priority level of "3" is acquired as a result of the calculation (in FIG. 6, a number denoted in the range of each group management terminal represents the priority level).

Since the calculated priority level "3" is less than "10" corresponding to the threshold value Valth, the transmission determination unit 103b determines that the participation request needs to be transmitted to the group management terminals 100b and 100e that are located adjacent thereto, and the transmission unit 101b transmits the participation request to the group management terminals 100b and 100e (steps S21 and S22).

Similarly, since the priority level calculated based on the received participation request is less than the threshold value "10", the transmission determination unit of each of the group management terminals 100b, 100c, and 100d determines that the participation request needs to be transmitted, and the participation request is transmitted from the transmission unit of each of the group management terminals (steps S23 to S26).

On the other hand, since the priority level calculated based on the received participation request is "10", the transmission determination unit of the group management terminal 100e includes a member terminal as a candidate that is connected by the highest priority level within the group to which it belongs. Accordingly, the priority level calculating unit of the group management terminal 100e determines that further transmission is meaningless, and the participation request is not transmitted from the transmission unit of the group management terminal 100e (step S27).

As described above, the transmission determination unit 103b compares the calculated priority level $ValG_G$ of the group to which it belongs and the threshold value Valth, the participation request is transmitted to another group management terminal only in a case where $ValG_G$ is less than Valth ($ValG_G$<Valth), and the participation request is not transmitted in a case where $ValG_G$ is Valth or more ($ValG_G \geq$ Valth). As a result, the searching for a terminal that is optimal for a connection and the suppressing of unnecessary transmission of a participation request can be achieved together.

The reply determination unit 103c is a unit that determines whether or not a reply to the new participating terminal 200 is necessary based on the priority level calculated by the priority level calculating unit 103a. For example, the priority level $ValG_G$ calculated by the priority level calculating unit 103a and the priority level Valmax extracted from the received participation request are compared with each other, and in a case where the value of the priority level Valmax is the value of the priority level $ValG_G$ or less (Valmax$\leq ValG_G$), the group management terminal transmits a reply to the new participating terminal 200.

As illustrated in FIG. 3, the priority level Valmax is information that is included in the participation request and is the maximum priority level out of the priority levels calculated by the group management terminal of each group through which the participation request passes.

In a case where the reply determination unit 103c determines that a reply to the new participating terminal 200 is necessary, the information of Valmax is updated with the priority level $ValG_G$ by the reply determination unit 103c. To be more specific, in a case where the priority level Valmax is the priority level $ValG_G$ or less (Valmax $ValG_G$), the reply determination unit 103c updates the value of the priority level Valmax with the value of the priority level $ValG_G$.

In addition, in the reply to the new participating terminal 200 that is transmitted from the above-described transmission unit 101b, information (for example, the terminal information managing table 102a illustrated in FIG. 4) of each member terminal of which the priority level is calculated, or the priority level of each member terminal as a candidate of the connection are included.

As described above, the priority level $ValG_G$ is calculated by the group management terminal of each group, and every time the value of the priority level $ValG_G$ is the value of the priority level Valmax or more, the group management terminal of each group replies to the new participating terminal 200. Accordingly, there is a case where the new participating terminal 200 is notified of a plurality of connection candidate terminals from a plurality of the group management terminals. In such a case, the new participating terminal 200 selects a member terminal having the highest priority level out of member terminals as a plurality of notified candidates of a connection destination as a member terminal that is optimal for the connection.

The initial value of the priority level Valmax is set to "0", and accordingly, the priority level of a participation request that is transmitted from the new participating terminal 200 to the group management terminal 100a for the first time is "0". Therefore, the group management terminal 100a that has received the participation request having a priority level of "0" unconditionally replies to the new participating terminal 200.

Figure 7:
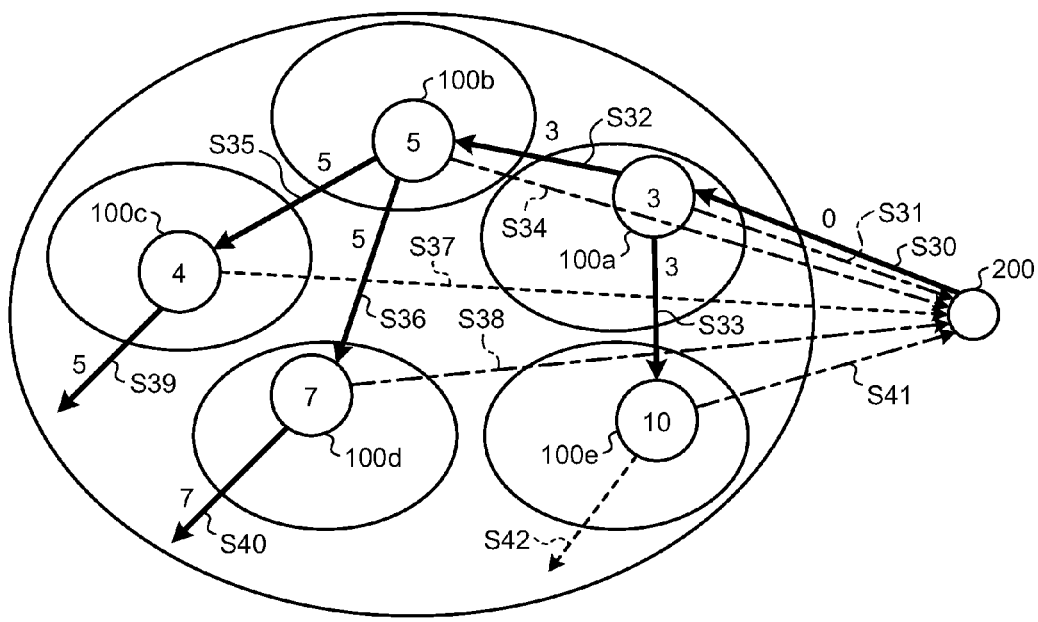
FIG. 7 is a diagram illustrating an example of determining reply or no-reply.

Next, an example of the determination of reply or no-reply will be described with reference to FIG. 7. FIG. 7 is a diagram illustrating an example of determining reply or no-reply. FIG. 7 illustrates a case where the new participating terminal 200 transmits a participation request to the group management terminal 100a of Group 1 (step S30). In addition, the threshold value Valth is assumed to be "10", similarly to the case of FIG. 6.

The priority level calculating unit 103a calculates the priority level of the group to which it belongs based on the received participation request, and it is assumed that a priority level of "3" is acquired as a result of the calculation. In addition, since the received participation request is the first participation request transmitted when a new participating terminal 200 participates in the delivery network, the priority level Valmax is "0" (initial value). Accordingly, the reply determination unit 103c extracts the priority level Valmax of "0" from the received participation request.

Since the priority level Valmax extracted by the reply determination unit 103c is the calculated priority level $ValG_G$ or less (Valmax$\leq ValG_G$), the reply determination unit 103c updates the priority level Valmax with a priority level "3".

Since the priority level Valmax "0" extracted by the reply determination unit 103c is updated with the priority level "3", the transmission unit 101b replies to the new participating terminal 200 (step S31).

Then, since the priority level "3" calculated by the priority level calculating unit 103a is less than the threshold value "10" ($ValG_G$<Valth), the transmission unit 101b transmits the received participation request to the group management terminal 100b and the group management terminal 100e (steps S32 and S33).

Next, the priority level calculating unit of the group management terminal 100b that has received the participation request from the group management terminal 100a calculates the priority level of the group to which it belongs based on the received participation request, and it is assumed that a priority level "5" is acquired as a result of the calculation.

The reply determination unit of the group management terminal 100b extracts a priority level Valmax "3" from the received participation request. Since the extracted priority level Valmax is the calculated priority level $ValG_G$ or less (Valmax$\leq ValG_G$), the reply determination unit of the group management terminal 100b updates the priority level Valmax with a priority level "5".

Since the priority level Valmax "3" extracted by the reply determining unit of the group management terminal 100b is updated with the calculated priority level "5", the transmission unit of the group management terminal 100b replies to the new participating terminal 200 (step S34).

Then, since the priority level "5" calculated by the priority level calculating unit of the group management terminal 100b is less than the threshold value "10" ($ValG_G$<Valth), the transmission unit of the group management terminal 100b transmits the participation request to the group management terminal 100c and the group management terminal 100d (steps S35 and S36).

Similarly, the priority level calculating unit of the group management terminal 100d also calculates the priority level based on the received participation request, and it is assumed that a priority level "7" is acquired as a result of the calculation. In this case, since the calculated priority level $ValG_G$ is the priority level Valmax, which is included in the received participation request, or less (Valmax$\leq ValG_G$), the reply determining unit of the group management terminal 100d updates the priority level Valmax with a priority level "7", and the transmission unit of the group management terminal 100d replies to the new participating terminal 200 (step S38).

Then, the transmission unit of the group management terminal 100d transmits the participation request to another group management terminal (not illustrated in the figure) (step S40).

Meanwhile, after the transmitted participation request is received, the priority level calculating unit of the group management terminal 100c calculates the priority level of the group to which it belongs based on the received participation request, and it is assumed that a priority level "4" is acquired as a result of the calculation.

In addition, the reply determination unit of the group management terminal 100c extracts a priority level Valmax "5" from the received participation request. Since the extracted priority level Valmax "5" is more than the calculated priority level ValG$_G$, the relationship of Valmax≤ValG$_G$ is not satisfied. Accordingly, the reply determination unit of the group management terminal 100c does not update the priority level Valmax with a priority level "4".

As above, the priority level Valmax "5" extracted by the reply determination unit of the group management terminal 100c is not updated, and the transmission unit of the group management terminal 100c does not reply to the new participating terminal 200 (step S37).

Then, since the priority level "4" calculated by the priority level calculating unit of the group management terminal 100c is less than the threshold value "10" (ValG$_G$<Valth), the reply determination unit of the group management terminal 100c does not updates the priority level "5" included in the participation request, and the transmission unit of the group management terminal 100c transmits the participation request to another group management terminal (not illustrated in the figure) (step S39).

After the participation request is received from the group management terminal 100a, the priority level calculating unit of the group management terminal 100e calculates the priority level of the group to which it belongs based on the received participation request, and it is assumed that a priority level "10" is acquired as a result of the calculation.

Then, the reply determination unit of the group management terminal 100e extracts a priority level Valmax "3" from the received participation request. Since the calculated priority level "10" is the priority level Valmax, which is added in the received participation request, or less (Valmax≤ValG$_G$), the reply determination unit of the group management terminal 100e updates the priority level Valmax with the priority level "10", and the transmission unit of the group management terminal 100e replies to the new participating terminal 200 (step S41).

On the other hand, the priority level "10" calculated by the priority level calculating unit of the group management terminal 100e is the same as the threshold value "10" (ValG$_G$=Valth). Accordingly, the calculated priority level "10" is not less than the priority level Valth (ValG$_G$>Valth), and the transmission unit of the group management terminal 100e does not transmit the participation request to another group management terminal (step S42).

In this embodiment, although the reply to the participation request is directly transmitted to the new participating terminal 200, a method may be used in which a route through which the participation request is relayed is recorded, and the reply is transmitted to the new participating terminal by tracing the recorded route in the reverse order.

For example, when replying to the new participating terminal 200, the group management terminal 100c may transmit a reply to the new participating terminal 200 in the route of the group management terminal 100c, the group management terminal 100b, the group management terminal 100a, and the new participating terminal 200.

As above, in a case where the priority level Valmax extracted by the reply determination unit of each group management terminal exceeds the priority level ValG$_G$ (Valmax>ValG$_G$), each group management terminal does not reply to the new participating terminal 200. In a case where a member terminal having a high priority level is present on the route through which the participation request is transmitted, there is high possibility that the member terminal is selected by the new participating terminal 200, and accordingly, an advantage of suppressing a reply that has low possibility of being selected when it is transmitted can be acquired through such a process.

Figure 8:
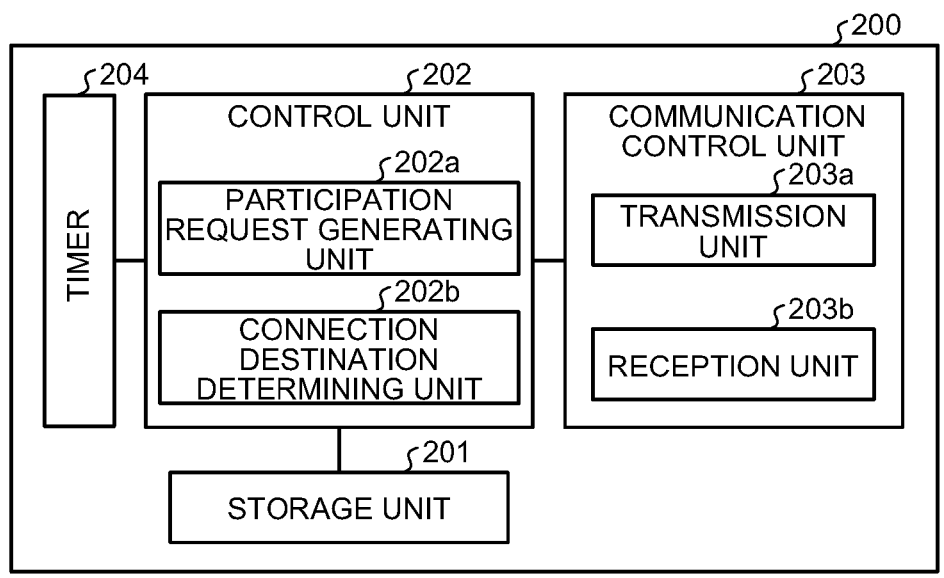
FIG. 8 is a functional block diagram illustrating the configuration of a new participating terminal according to the embodiment.

Next, the configuration of a new participating terminal according to the embodiment will be described. FIG. 8 is a functional block diagram illustrating the configuration of a new participating terminal 200 according to the embodiment.

The new participating terminal 200 performs login for the group management terminal 100a and acquires the terminal information (for example, the IP address of the group management terminal 100a as an entry point and the port number thereof) of the group management terminal 100a. Here, the group management terminal 100a performs authorization using a user ID, a password, or the like when the login is admitted.

Then, the new participating terminal 200 is a device that generates a participation request based on the acquired terminal information, transmits the generated participation request to the group management terminal (for example, the group management terminal 100a) as a target, receives a reply from each group management terminal for a predetermined time (t seconds), and determines a member terminal to be connected thereto from the member terminal list included in the reply.

As illustrated in FIG. 8, particularly, the new participating terminal 200 closely relates to the present invention and includes a storage unit 201, a control unit 202, a communication control unit 203, and a timer 204.

The storage unit 201 is a storage unit such as a memory or a hard disk that stores therein various items (the terminal information, the ISP information, the default GW information, and the like) included in the participation request.

The control unit 202 is a unit that generates a participation request transmitted to the group management terminal 100a by the new participating terminal 200 and determines a connection destination of the new participating terminal 200 and includes a participation request generating unit 202a and a connection destination determining unit 202b.

The participation request generating unit 202a is a unit that generates a participation request (for example, FIG. 3) to be transmitted to the group management terminal based on various items stored in the storage unit 201 and outputs the generated participation request to a transmission unit 203a.

The connection destination determining unit 202b is a unit that determines a terminal (for example the member terminal 1 within Group 1) to be connected from the member terminal list received within the predetermined time (t seconds) by a reception unit 203b.

In addition, when the new participating terminal 200 is connected to a member terminal (for example, the member terminal 1) within an arbitrary group (for example, Group 1), the connection destination determining unit 202b outputs a connection completion state and the terminal information of the new participating terminal 200 to the transmission unit 203a for the group management terminal 100a.

The communication control unit 203 is a unit that is used by the new participating terminal 200 for communicating with each group management terminal or each member terminal. This communication control unit 203 includes a transmission unit 203a, a reception unit 203b, and a timer 204.

The transmission unit 203a is a unit that transmits the participation request generated by the participation request generating unit 202a or a connection completion notification to the group management terminal 100a. In addition, when the connection completion notification is received from the reception unit 101a, each group management terminal updates the terminal information managing table (see FIG. 4) within the group to which it belongs.

The reception unit 203b is a unit that receives the member terminal list from each group management terminal (for example, the group management terminal of Group 1) and outputs the received member terminal list to the control unit 202.

The timer 204 is a unit that outputs time information to the control unit 202. Accordingly, the control unit 202 sets the time for receiving the member terminal information (for example, the terminal information managing table 102a) based on the time information output from the timer 204.

In addition, the generation of a new group may be performed by a network supervisor using various methods. For example, an authorized number of the member terminals configuring the group is set in advance, and, in a case where the number of the terminals within the group reaches the authorized number, and the terminal to be connectable is within the group, a new group is generated, and the new participating terminal may serve as both the first member terminal and the group management terminal of the new group.

Figure 9:
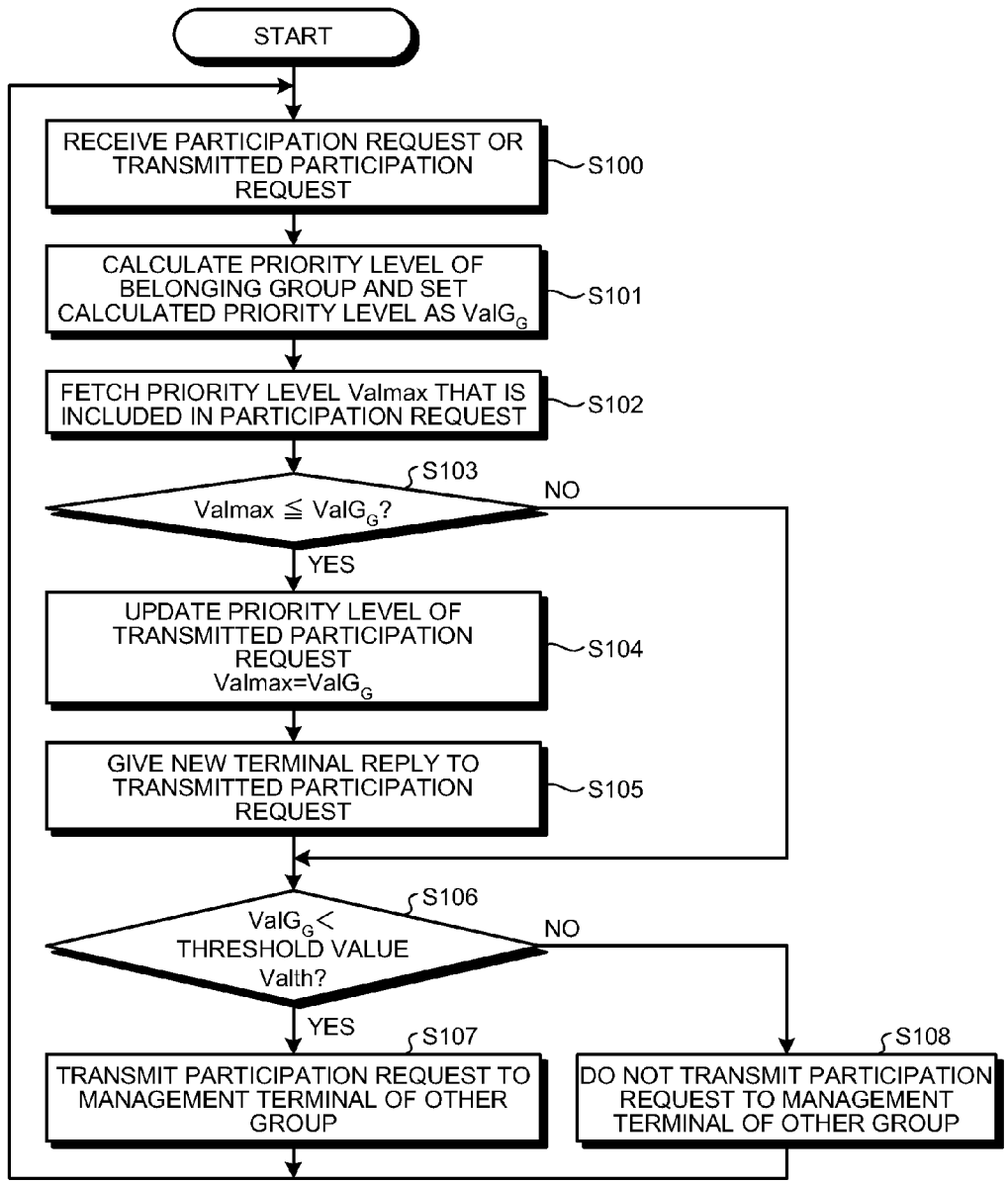
FIG. 9 is a flowchart illustrating the processing sequence of a group management terminal according to the embodiment.

Next, the processing sequence performed by the group management terminal 100a will be described. FIG. 9 is a flowchart illustrating the processing sequence of the group management terminal 100a according to the embodiment.

As illustrated in FIG. 9, the reception unit 101a receives a participation request from the new participating terminal 200 or a participation request transmitted from another group management terminal (step S100).

Next, the priority level calculating unit 103a calculates the priority level $ValG_G$ within the group to which it belongs based on the received participation request and the terminal information managing table 102a (step S101) and takes out the priority level Valmax that is included in the participation request received by the reply determination unit 103c (step S102).

Then, the reply determination unit 103c compares the priority level $ValG_G$ calculated by the priority level calculating unit 103a and the taken priority level Valmax with each other and, in a case where the priority level Valmax is the priority level $ValG_G$ or less (step S103; Yes), updates the priority level Valmax included in the transmitted participation request with the priority level $ValG_G$ (step S104).

Then, the reply determination unit 103c replies to the transmitted participation request for the new participating terminal 200 (step S105).

On the other hand, in a case where the priority level Valmax exceeds the priority level $ValG_G$ (step S103; No), the process proceeds to step S106.

Next, in a case where the priority level $ValG_G$ is less than a threshold value Valth defined in advance (step S106; Yes), the transmission determination unit 103b transmits the received participation request to another group management terminal (step S107). Thereafter, the process is returned to step S100, and a process of receiving a participation request is performed.

On the other hand, in a case where the calculated priority level $ValG_G$ is the threshold value Valth defined in advance or more (step S106; No), the transmission determination unit 103b does not transmit the received participation request to another group management terminal (step S108). Thereafter, the process is returned to step S100, and the process of receiving a participation request is performed.

Figure 10:
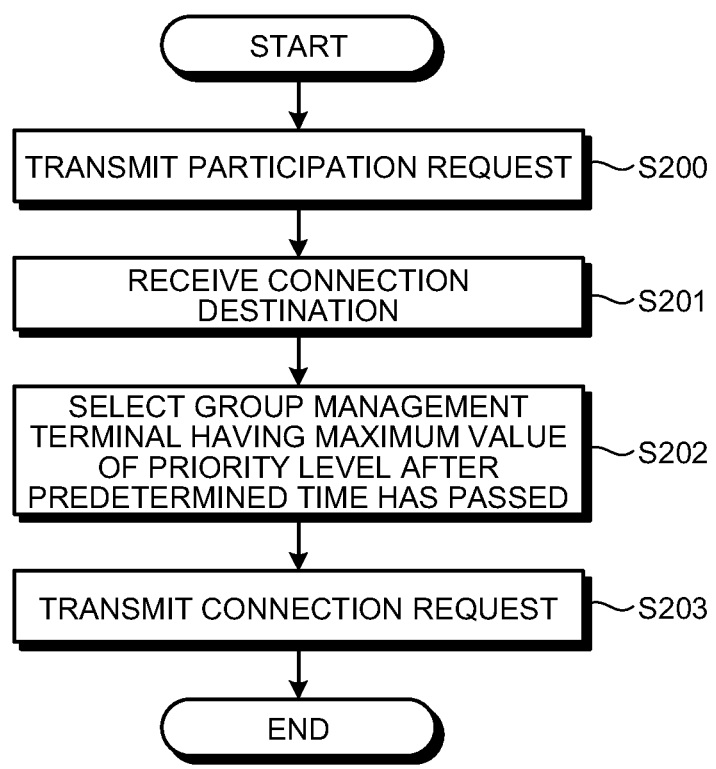
FIG. 10 is a flowchart illustrating the processing sequence of a new participating terminal according to the embodiment.

Next, the processing sequence of the new participating terminal 200 will be described. FIG. 10 is a flowchart illustrating the processing sequence of a new participating terminal according to the embodiment.

As illustrated in FIG. 10, first, the new participating terminal 200 transmits a participation request to the group management terminal 100a (step S200).

Next, the new participating terminal 200 receives a connection destination notification that includes information such as the priority level $ValG_G$ of each group management terminal from each group management terminal for a predetermined time (step S201) and, after a predetermined time elapses, selects a group management terminal of which the priority level $ValG_G$ has the maximum value based on the received information (step S202).

After the group management terminal to be connected is determined, the new participating terminal 200 transmits a connection request to the group management terminal for which the connection request is determined and ends the process (step S203). Here, the connection request may be directly transmitted not to the determined group management terminal but to the terminal of which the priority level $ValG_G$ is the maximum within the group.

As described above, the group management terminal 100a according to this embodiment can efficiently determine a terminal that is optimal for the connection of the new participating terminal 200 by calculating a priority level based on the participation request received by the priority level calculating unit 103a only in a case where the participation request is received and determining whether to reply to another group management terminal based on the calculated priority level, whereby the traffic required for searching for a terminal that is optimal for the connection can be suppressed.

Of the processes described in this embodiment, a part of the process described to be automatically performed may be manually performed, or the entire or a part of the process described to be manually performed may be automatically performed by using a known method. Furthermore, the processing sequence, the control sequence, a specific name, and information including various kinds of data represented in this document or drawings may be arbitrarily changed unless otherwise mentioned.

In addition, each constituent element of the group management terminal 100a or the new participating terminal 200 illustrated in FIGS. 2 and 8 is in a functional and conceptual sense, and thus it does not need to be necessarily configured as illustrated in the drawings in a physical sense. In other words, a specific form of separation/integration of each device is not limited to that illustrated in the figure, and the entire or a part thereof may be configured by being separated or integrated functionally or physically in arbitrary units based on various loads, states of usage, and the like. Furthermore, the entire or a part of each processing function performed in each device may be implemented by a CPU and a program that is interpreted and executed by the CPU or may be realized as hardware through wired logics.

Figure 11:
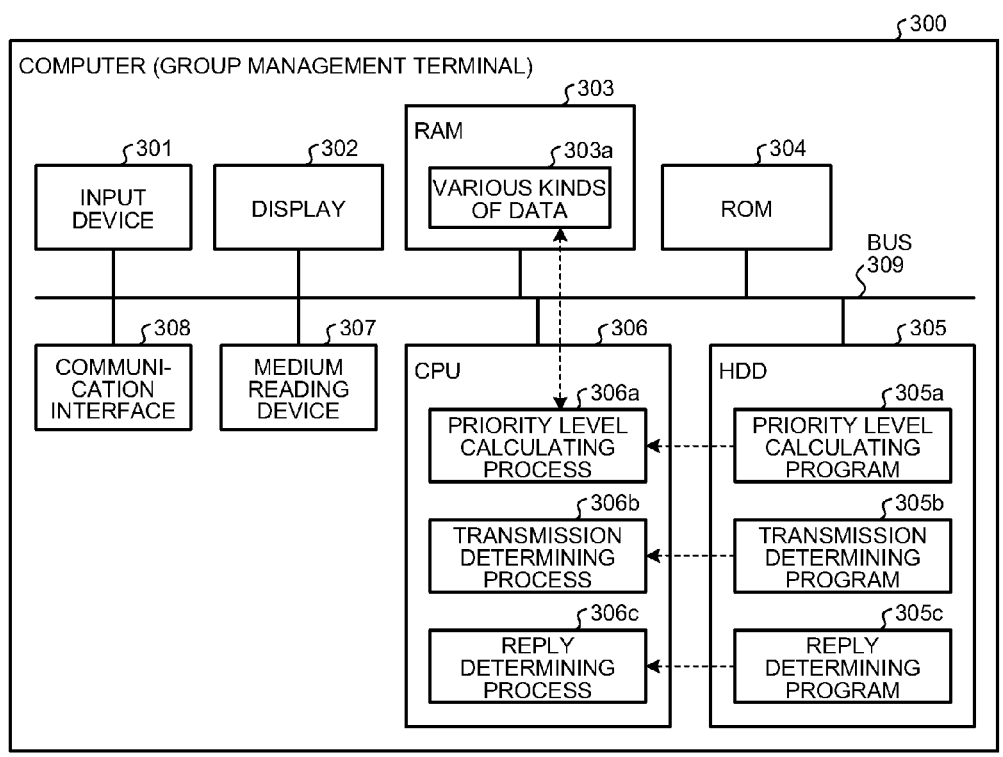
FIG. 11 is a diagram illustrating the hardware configuration of a computer that configures a group management terminal according to the embodiment.
Figure 12:
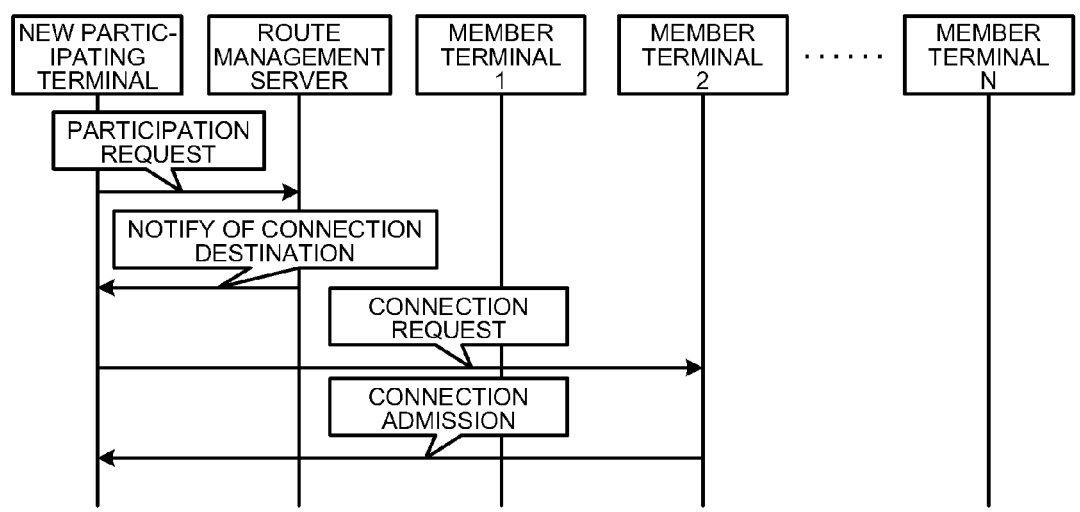
FIG. 12 is a diagram illustrating a problem in a hybrid-type P2P.
Figure 13:
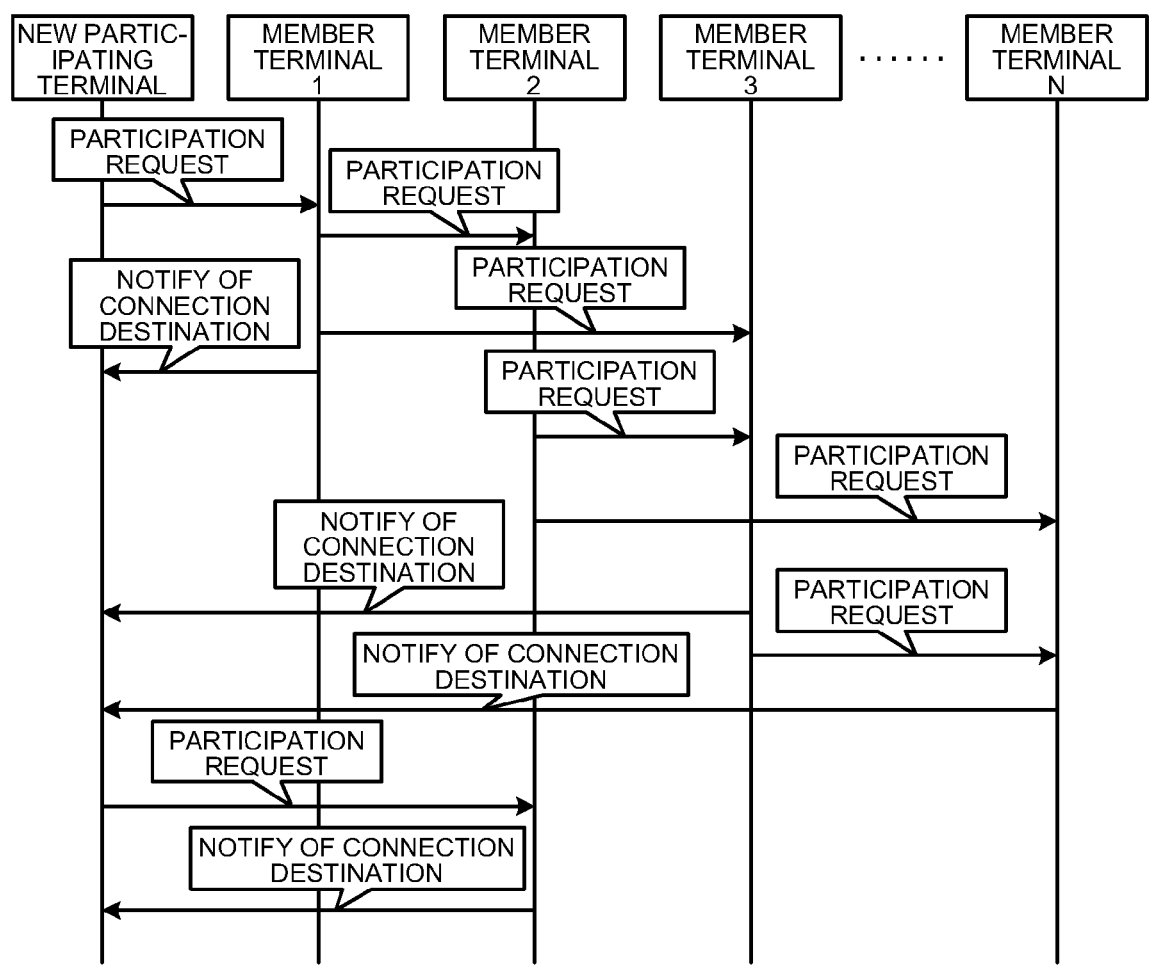
FIG. 13 is a diagram illustrating a problem in a pure-type P2P.

FIG. 11 is a diagram illustrating the hardware configuration of a computer that configures a group management terminal according to the embodiment. As illustrated in FIG. 11, in this computer 300, an input device 301, a display 302, a random access memory (RAM) 303, a read only memory (ROM) 304, a hard disk drive (HDD) 305, a central processing unit (CPU) 306, a medium reading device 307, a communication interface 308 are interconnected through a bus 309.

In the HDD 305, a priority level calculating program 305a that fulfills the same function as the above-described priority level calculating function, a transmission determining program 305b that fulfills a function of determining transmission or no-transmission of a participation request, and a reply determining program 305c that fulfills a function of determining reply or no-reply to the new participating terminal are stored. By using the CPU 306, a priority level calculating process 306a is activated by reading out and executing the priority level calculating program 305a, a transmission determining process 306b is activated by reading out and executing the transmission determining program 305b, and a reply determining process 306c is activated by reading out and executing the reply determining program 305c. Here, the priority level calculating process 306a corresponds to the priority level calculating unit 103a illustrated in FIG. 2, the transmission determining process 306b corresponds to the transmission determination unit 103b illustrated in FIG. 2, and the reply determining process 306c corresponds to the reply determination unit 103c illustrated in FIG. 2.

In addition, in the RAM 303, various kinds of data 303a is stored which includes each terminal information managing table, the format of a participation request, and data that is used by the priority level calculating process 306a, the transmission determining process 306b, and the reply determining process 306c. The CPU 306 calculates a priority level each terminal and the like based on each terminal information managing data included in the various kinds of data 303a, a participation request, and the like and determines the transmission or the reply based on the calculated priority level.

However, the priority level calculating program 305a, the transmission determining program 305b, and the reply determining program 305c illustrated in FIG. 11 do not necessarily need to be stored in the HDD 305 from the start. For example, the priority level calculating program 305a, the transmission determining program 305b, and the reply determining program 305c may be stored on, for example, a "portable physical medium" such as a flexible disc (FD), a CD-ROM, a DVD disc, a magneto optical disc, or an IC card that is inserted into the computer, a "fixed physical medium" such as a hard disk drive (HDD) that can be equipped inside or outside the computer, "another computer (or a sever)" that is connected to the computer through a public circuit line, the Internet, a LAN, a WAN, or the like, or the like so that the computer can read out and execute the priority level calculating program 305a, the transmission determining program 305b, and the reply determining program 305c.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A group management device having a processor comprising:
   a determination unit that determines, using the processor, when receiving participation request of a participating terminal device which requests participation into a peer-to-peer network, a first priority level for allowing the participating terminal device to participate in a first group that is managed by the group management device, based on information relating to the participating terminal device and information relating to terminal devices belonging to the first group;
   a priority level determining unit that determines, using the processor whether or not the first priority level exceeds a second priority level included in the participation request, the second priority level being zero or a highest priority level calculated before the participation request is sent to the group management device; and
   a reply determining unit that updates, using the processor, the second priority level included in the participation request with the first priority level when the first priority level is equal to or higher than the second priority level, transmits a reply to the participation request, and determines whether to transfer the updated participation request to another group management device, the reply determining unit not updating the second priority level included in the participation request when the first priority level is lower than the second priority level,
   wherein the information relating to the terminal devices belonging to the first group includes IP address information, provider information, default gateway information, the number of connectable terminal devices within the first group, a desired acceptance level of the participating terminal device to be accepted by the group management device, information relating to past connection history, or a combination thereof.

2. The group management device according to claim 1, further comprising:
   a transmission determining unit that determines whether to transmit the participation request to a second group management device managing a second group by comparing the first priority level with a threshold value set in advance.

3. The group management device according to claim 1, wherein the reply includes the information relating to the terminal devices belonging to the first group, information of the first priority level, or both.

4. A group management system, comprising:
   a plurality of group management devices each manage a group configured by aggregation of terminal devices performing communication; and
   a participating terminal device, wherein
   a first group management device having a processor among the plurality of group management devices includes
      a determination unit that determines, using the processor, when receiving participation request of the participating terminal device which requests participation into a peer-to-peer network, a first priority level for allowing the participating terminal device to participate in a first group that is managed by the first group management device based on information relating to the participating terminal device and information relating to terminal devices belonging to the first group;
      a priority level determining unit that determines, using the processor, whether or not the first priority level exceeds a second priority level included in the participation request, the second priority level being zero or a highest priority level calculated before the participation request is sent to the first group management device; and a reply determining unit that updates, using the processor, the second priority level included in the participation request with the first priority level when the first priority level is equal to or higher than the second priority level, transmits a reply to the participation request, and determines whether to transfer the updated participation request to another group management device, the reply determining unit not updating the second priority level included in the participation request when the first priority level is lower than the second priority level, and the participating terminal device includes a connection destination determining unit that determines, when receiving a reply from one or more of the plurality of group management devices, at least one of the terminal devices belonging to groups managed by the one or more of the plurality of group management devices as a connection destination terminal device, based on priority levels that are determined for the groups managed by the one or more of the plurality of group management devices, and that allows the participating terminal device to participate in the group to which the connection destination terminal device belongs, wherein the information relating to the terminal devices belonging to the first group includes IP address information, provider information, default gateway information, the number of connectable terminal devices within the first group, a desired acceptance level of the participating terminal device to be accepted by the group management device, information relating to past connection history, or a combination thereof.

5. A group management method performed by a group management device that manages a group configured by aggregation of terminal devices performing communication, the group management method comprising:

firstly determining, when receiving participation request of a participating terminal device which requests participation into a peer-to-peer network, a first priority level for allowing the participating terminal device to participate in a first group that is managed by the group management device, based on information relating to the participating terminal device and information relating to terminal devices belonging to the first group;

secondly determining whether or not the first priority level exceeds a second priority level included in the participation request, the second priority level being zero or a highest priority level calculated before the participation request is sent to the group management device; and (i) updating the second priority level included in the participation request with the first priority level when the first priority level is equal to or higher than the second priority level, transmitting a reply to the participation request, and determining whether to transfer the updated participation request to another group management device, while (ii) not updating the second priority level included in the participation request when the first priority level is lower than the second priority level, wherein the information relating to the terminal devices belonging to the first group includes IP address information, provider information, default gateway information, the number of connectable terminal devices within the first group, a desired acceptance level of the participating terminal device to be accepted by the group management device, information relating to past connection history, or a combination thereof.

6. The group management method according to claim 5, further comprising thirdly determining whether to transmit the participation request to a second group management device managing a second group by comparing the first priority level with a threshold value set in advance.

7. The group management method according to claim 5, wherein the reply includes the information relating to the terminal devices belonging to the first group, information of the first priority level, or both.

8. A computer-readable, non-transitory medium storing a group management program for managing a group configured by aggregation of terminal devices performing communication through a group management device, the group management program causing a computer to execute a process, the process comprising:

firstly determining, when receiving participation request of a participating terminal device which requests participation into a peer-to-peer network, a first priority level for allowing the participating terminal device to participate in a first group that is managed by the group management device, based on information relating to the participating terminal device and information relating to terminal devices belonging to the first group;

secondly determining whether or not the first priority level exceeds a second priority level included in the participation request, the second priority level being zero or a highest priority level calculated before the participation request is sent to the group management device; and (i) updating the second priority level included in the participation request with the first priority level when the first priority level is equal to or higher than the second priority level, transmitting a reply to the participation request, and determining whether to transfer the updated participation request to another group management device, while (ii) not updating the second priority level included in the participation request when the first priority level is lower than the second priority level, wherein the information relating to the terminal devices belonging to the first group includes IP address information, provider information, default gateway information, the number of connectable terminal devices within the first group, a desired acceptance level of the participating terminal device to be accepted by the group management device, information relating to past connection history, or a combination thereof.

9. The computer-readable, non-transitory medium according to claim 8, wherein the process further comprises thirdly determining whether to transmit the participation request to a second group management device managing a second group by comparing the first priority level with a threshold value set in advance.

10. The computer-readable, non-transitory medium according to claim 8, wherein the reply includes the information relating to the terminal devices belonging to the first group, information of the first priority level, or both.

* * * * *